United States Patent [19]
Tripi

[11] Patent Number: 5,855,461
[45] Date of Patent: Jan. 5, 1999

[54] ANCHOR FOR A THREADED FASTENER

[76] Inventor: Timothy Tripi, 18242 Manorwood Cir., Clinton Township, Mich. 48038

[21] Appl. No.: 899,177

[22] Filed: Jul. 23, 1997

[51] Int. Cl.⁶ .............................. F16B 19/00; F16B 37/04
[52] U.S. Cl. ............................ 411/182; 411/509; 411/913
[58] Field of Search ................................ 411/107, 173, 411/176, 182, 508, 509, 913

[56] References Cited

U.S. PATENT DOCUMENTS

| | | | |
|---|---|---|---|
| 2,295,480 | 9/1942 | Johnson | 411/173 |
| 2,571,394 | 10/1951 | Trafton . | |
| 3,400,743 | 9/1968 | Strange . | |
| 4,014,245 | 3/1977 | Frye et al. | 411/182 X |
| 4,587,705 | 5/1986 | Ruck et al. . | |
| 4,735,534 | 4/1988 | Oehlke . | |
| 4,828,440 | 5/1989 | Anderson et al. . | |
| 4,906,152 | 3/1990 | Kurihara | 411/182 |
| 5,201,564 | 4/1993 | Price . | |
| 5,536,125 | 7/1996 | Gaw, Jr. . | |
| 5,593,263 | 1/1997 | Clinch et al. | 411/182 |

*Primary Examiner*—Neill R. Wilson
*Attorney, Agent, or Firm*—John R. Benefiel

[57] ABSTRACT

An anchor for securing a threaded fastener component in a hole in a supporting panel structure, the anchor being formed of a flat sheet metal disc portion of a greater diameter than the hole and having strips attached at one end to the disc portion and extending radially inward and outward to position a tip inclined edge across the hole perimeter. The strips are cammed to be deflected inwardly as the anchor is forced into the hole with the disc portion against the front side of the supporting structure. The anchor is captured by the perimeter of the hole between the disc outer perimeter and the strip tips. The tips are captured in slotted tabs extending from the rear side of the disc portion.

7 Claims, 2 Drawing Sheets

ANCHOR FOR A THREADED FASTENER

BACKGROUND OF THE INVENTION

This invention concerns anchors for securing one component of a threaded fastener to a supporting panel structure, as to mount a separate piece to the structure by the use of a mating fastener.

A typical application is found in the automotive industry where various body parts are mounted to a sheet metal panel by means of an anchor attached to the sheet metal pane, typically by a simple snap-in installation.

Current trends in automotive design have resulted in less available space behind the sheet metal to accommodate the anchor, which is typically held in place by panel engaging fingers extending back from the rear surface of the sheet metal panel.

Such prior designs have heretofore required significant depth behind the panel, and hence there is a need for a more compact retention structure for such snap-in anchors.

There is often a requirement that such anchors have substantial strength to resist pullout forces exerted by tightening of the mating threaded fastener component, and that the load be distributed over an area of the panel structure to enable loaded portions of the panel structure itself to be able to withstand the pullout forces.

The anchor should preferably be easily installed by simply inserting a portion of the anchor into a hole in the supporting panel structure, without requiring the installation of additional parts in order to minimize assembly labor. The anchor itself should be able to be manufactured at low cost.

Accordingly, it is the object of the present invention to provide a threaded fastener anchor able to be easily installed by insertion into an opening in a support panel structure, which requires minimal space behind the support panel structure, and which provides ample strength to resist pull-out forces.

SUMMARY OF THE INVENTION

The above-recited object of the present invention and others which will be appreciated upon a reading of the following specification and claims are achieved by an anchor formed from a generally disc-shaped piece of flat sheet material of a larger diameter than an installation hole in the support panel structure to which the anchor is to be secured. Pairs of thin strip sections of the sheet are folded back along a joining segment to be oriented on edge and disposed behind the main disc section in a plan parallel to the disc section.

The strip sections have a pair of legs, one leg fixed to the disc perimeter and extending radially inwardly and the other outwardly, being connected with a curved connecting section. The free tips are each inserted into a respective slotted tab folded up from the rear of the disc perimeter to capture the strips and prevent edgewise axial movement away from the disc section.

The free end strip tips extend beyond the perimeter of the installation hole and are angled out from their more remote edge to provide a camming surface which engages the perimeter of the installation hole in the supporting panel structure as the anchor is pushed into the hole to cause the strip sections to be resiliently deflected radially inward so as to be able to be moved past the hole perimeter. The shape of the curved segment of each strip allows this radial deflection.

The strip free end tips also have their underside notched out to allow the tip to move back out and onto the edge of the supporting structure installation hole perimeter, the supporting panel structure captured between outwardly lying portions of the disc section and the inside edge of the strip notched out tips. The strip tips are restrained by the formed and slotted tabs into which they are inserted.

This arrangement is very compact and yet has high strength to resist pullout, as the confined on edge strips provide a strong capturing.

The threaded fastener may comprise a threaded hole formed in the central area of the disc section or by a stud welded to the disc section.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
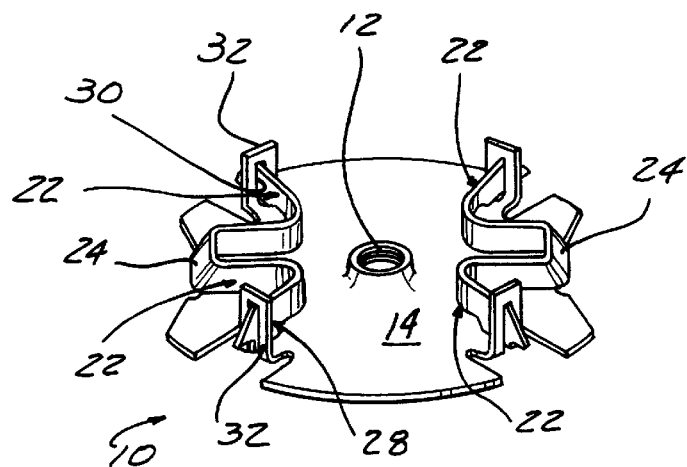
FIG. 1 is a rear perspective view of the anchor for threaded fasteners according to the present invention.

Referring to the drawings, FIG. 1 illustrates the anchor 10 for a threaded fastener component according to the present invention, here shown as a nut component, provided by a threaded hole 12 centrally located in a disc section 14 of the anchor 10.

Figure 5:
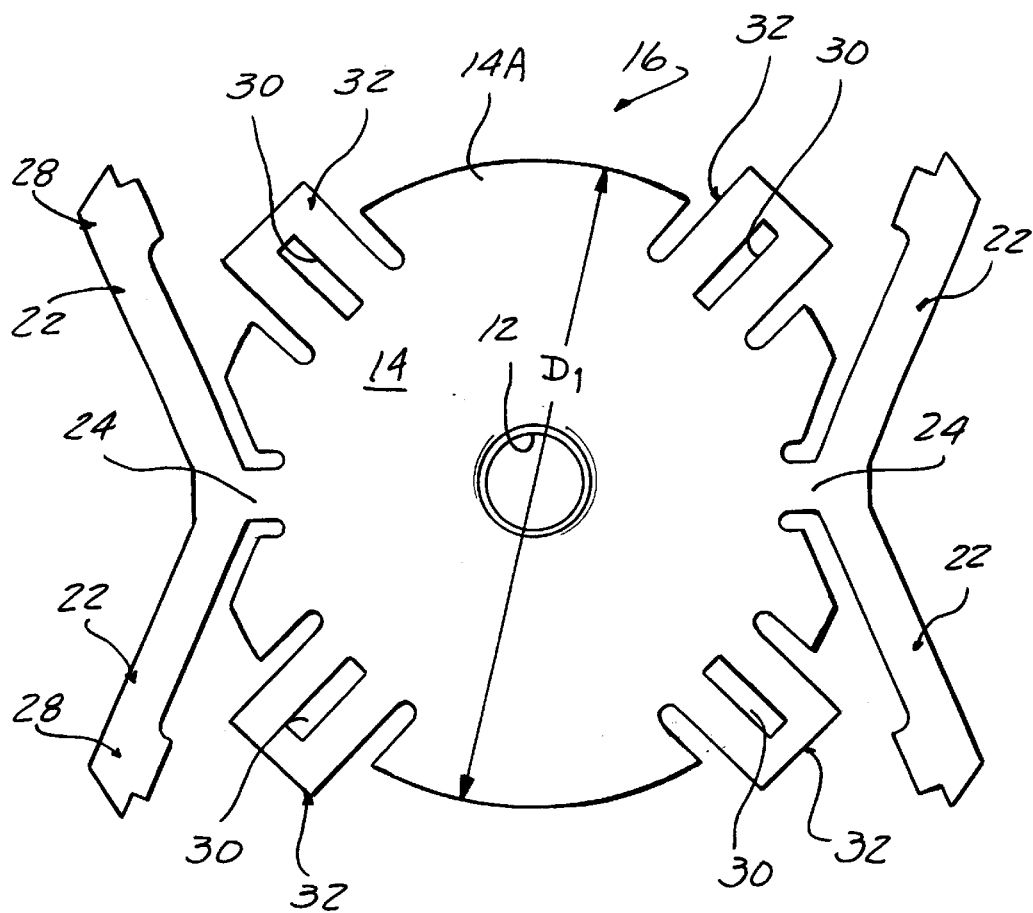
FIG. 5 is a plan view of a pattern of a blank from which the anchor of FIGS. 1–4 can be formed.
Figure 2:
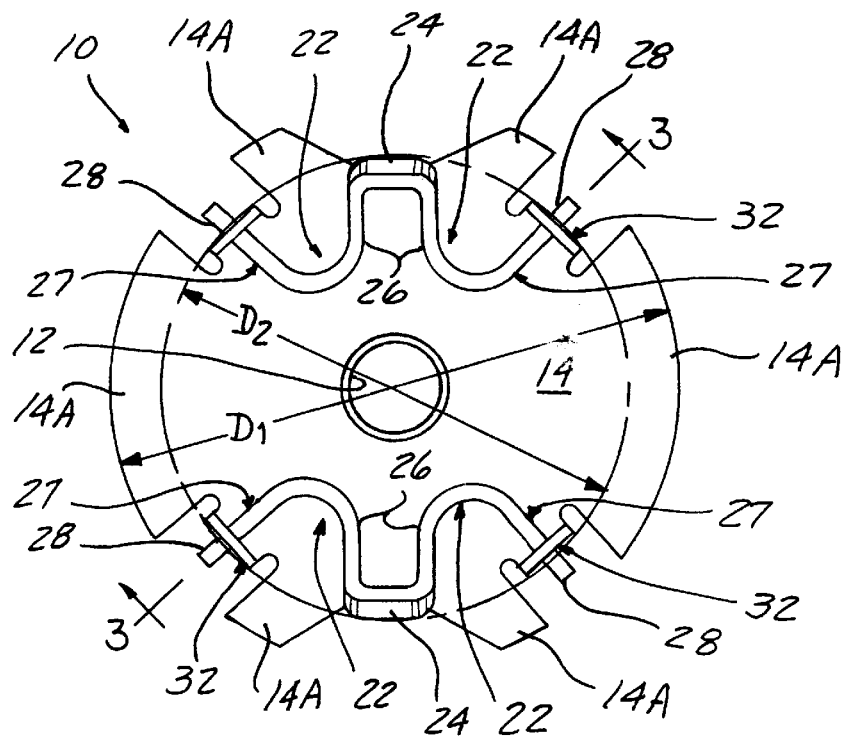
FIG. 2 is an enlarged rear plan view of the anchor shown in FIG. 1.
Figure 3:
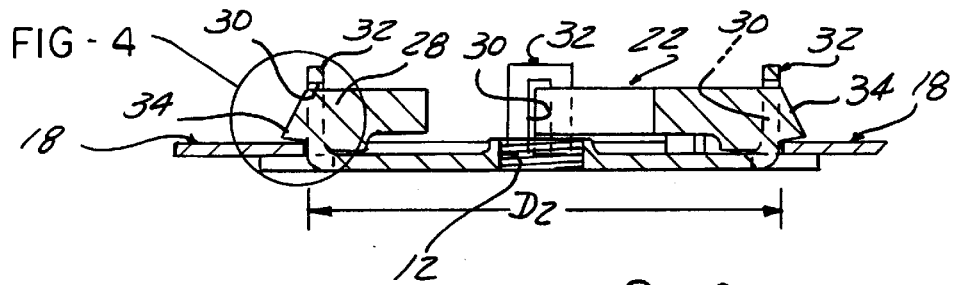
FIG. 3 is a sectional view through the anchor of FIG. 2 taken along the lines 3—3, together with adjacent fragmentary segments of a supporting structure into which the anchor is installed.
Figure 4:
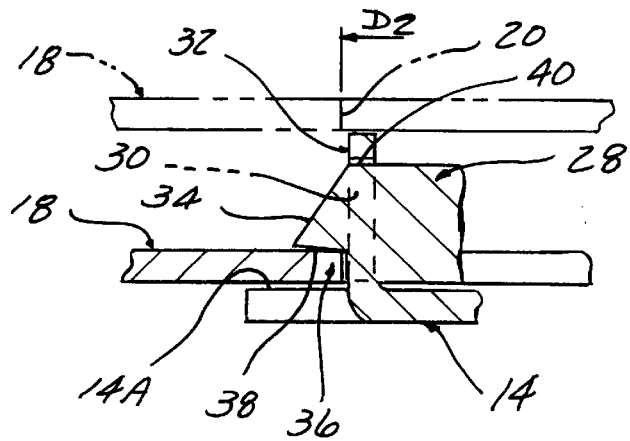
FIG. 4 is an enlarged fragmentary view of a portion of the anchor and supporting structure lying within the circle in FIG. 3.

The anchor 10 is constructed from a single thin flat piece of metal such as steel blank 16 die cut or, for low volume production, machined as by laser cutting as shown in FIG. 5. The blank 16 includes the disc section 14 having a diameter $D_1$ greater than the diameter $D_2$ of an installation hole 20 in a supporting structure 18. The hole 20 may be of various shapes and sizes.

The disc shape is interrupted by strip and tab features to be formed which will be located within the diameter $D_1$ of the main portion 14 after forming.

Pairs of formed strips 22 are arranged on edge at diametrically opposite locations on either side of the center of the disc section 14, projecting from the rear face of the disc section 14.

Each pair of strips 22 are integrally joined to the disc section 14 by a bridging segment 24 of the metal, which is folded up and in to dispose the strips 22 within the diameter $D_1$ of the center section 14.

The strips 22 includes a pair of legs connected by a segment formed into a curved shape. The fixed leg 26 extends radially inward from the connecting bridge portion 24 and then the free end leg 27 extends radially outward, locating free ends at the perimeter of diameter $D_2$ of the installation hole 20, the tips 28 thereof extending across the diameter $D_2$.

Each tip of the strip free end 28 is received into a slot 30 formed into a respective tab 32, bent to extend axially away from the rear face of the center section 14.

Each tip 28 is formed with an inclined edge 34, sloping outwardly towards the rear face of the disc section 14. The inclined edges 34 act as camming surfaces, forcing the strips 22 to be deflected radially inward by contacting the perimeter of the installation hole 20 when the anchor 10 is pushed into the hole 20 to install the same. The inclined edges 34 extend radially inwardly a sufficient distance to lie within the diameter $D_2$ of the hole 20 to insure that such camming action occurs.

A square cutout 36 is formed into the underside of each tip 28 beneath the edge 34 so that after each strip 22 is deflected radially inwardly to allow each tip 28 to pass through the hole 20, the strips 22 snap back out with the portion of the structure 18 adjacent the edge of the hole 20 moving into the space provided by the cutout 36. These portions are thus captured between the flat underside 38 of the tips 28 defining the cutout 36 and the rear surface 14A of the disc section 14 lying radially outward of the diameter $D_2$ of the hole 20. The tips 28 of the strips 22 are in turn restrained by the engagement of the flat tops 40 of the strips 22 with the top of the slots 30 in the tabs 32.

Accordingly, the shear strength of the on-edge strips restrained by the taps 32 provide considerable strength for the installation to resist pullout forces exerted by tightening down of a bolt in the hole 12 and the compression of a body (not shown) secured against the structure 18.

The installation is a simple push-in operation which does not require separate parts, and the anchor itself can be manufactured at low cost.

I claim:

1. An anchor for mounting a threaded fastener component to a generally round hole in a supporting panel structure, said anchor comprising:

a generally planar main portion configured to extend beyond said hole to overlie a perimeter area around said hole, said main portion carrying said threaded fastener component;

a series of flat strips each having one leg fixedly attached at one end to a rear side of said main portion, arranged to extend generally parallel to said rear side of said main portion projecting on edge with respect to said rear side, said strips each having an opposite leg free at one end projecting radially outward to normally lie across the perimeter of said hole, each of said strip free ends having a sloping tip edge adapted to engage an edge of said hole to be cammed radially inward as said anchor is pushed into said hole, said strips being configured to be able to be resiliently deflected radially inward to pass by said hole perimeter and into said hole, said strip tips also each having a notch which can accommodate the thickness of said panel structure to allow said strips to move radially back outward over a backside of said supporting structure past said hole to capture said supporting panel structure hole perimeter between said overlying portions of said main portion and an underside of said strip tip ends notched-out portion as said anchor is moved fully into said hole with said main portion abutting a front side of said supporting panel structure; and, a series of restraining features each fixed to said main portion and associated with a respective strip so as to restrain movement of said associated strip away from said rear side of said anchor main portion.

2. The anchor according to claim 1 wherein each of said anchor strips have a curved shape segment connecting said fixed one leg extending radially inward and said leg having a free end extending radially outwardly.

3. The anchor according to claim 2 wherein said restraining features each comprise a tab projecting from said rear side of said main portion and having an axially extending slot through which a respective strip passes edgewise to capture said strip.

4. The anchor according to claim 3 wherein said anchor is formed from sheet metal, said strips and tabs formed integrally with said main portion.

5. The anchor according to claim 4 wherein said main portion is disc-shaped, with portions of the perimeter thereof interrupted by said tabs and said one end of each strip formed therein radially inward of the outermost perimeter of said disc shape.

6. The anchor according to claim 2 wherein said strips are arranged in two pairs, each pair located at diametrically opposite locations from the other, said strips in each pair extending in opposite circumferential directions in curving from a radially inward to a radially outward direction.

7. The anchor according to claim 5 wherein said threaded fastener component comprises a threaded hole in said disc shaped main portion.

* * * * *